United States Patent
Wang et al.

(10) Patent No.: US 11,488,074 B2
(45) Date of Patent: Nov. 1, 2022

(54) METHOD FOR QUANTILE PROBABILISTIC SHORT-TERM POWER LOAD ENSEMBLE FORECASTING, ELECTRONIC DEVICE AND STORAGE MEDIUM

(71) Applicant: Tsinghua University, Beijing (CN)

(72) Inventors: Yi Wang, Beijing (CN); Ning Zhang, Beijing (CN); Chongqing Kang, Beijing (CN); Ershun Du, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 32 days.

(21) Appl. No.: 17/118,922

(22) Filed: Dec. 11, 2020

(65) Prior Publication Data

US 2021/0097453 A1  Apr. 1, 2021

Related U.S. Application Data

(63) Continuation of application No. PCT/CN2018/094551, filed on Jul. 4, 2018.

(30) Foreign Application Priority Data

Jun. 12, 2018 (CN) .......... 201810600576.X

(51) Int. Cl.
    *G06Q 10/04* (2012.01)
    *G06N 3/04* (2006.01)
    *G06Q 50/06* (2012.01)

(52) U.S. Cl.
    CPC .............. *G06Q 10/04* (2013.01); *G06N 3/04* (2013.01); *G06Q 50/06* (2013.01)

(58) Field of Classification Search
CPC combination set(s) only.
See application file for complete search history.

(56) References Cited

U.S. PATENT DOCUMENTS

| | | | |
|---|---|---|---|
| 2015/0317589 A1* | 11/2015 | Anderson | G06N 20/20 705/7.25 |
| 2016/0258361 A1* | 9/2016 | Tiwari | G06Q 50/06 |
| 2018/0204111 A1* | 7/2018 | Zadeh | G06N 3/0436 |

OTHER PUBLICATIONS

Wenjie Zhang. An Improved Quantile Regression Neural Network for Probabilistic Load Forecasting. IEEE Transactions on Smart Grid, vol. 10, No. 4, Jul. 2019 (Year: 2019).*
WIPO, ISR for PCT/CN2018/094551, Mar. 12, 2019.

* cited by examiner

*Primary Examiner* — Arif Ullah
(74) *Attorney, Agent, or Firm* — Hodgson Russ LLP

(57) ABSTRACT

The disclosure relates to a quantile probabilistic short-term power load ensemble forecasting method. The method includes: dividing historical power load data of a power system into a first data set and a second data set; performing bootstrap sampling on the first data set to generate multiple training data sets; training a neural network quantile regression model, a random forest quantile regression model and a gradient boosting regression tree regression model for the each training data set to obtain quantile forecasting models; establishing an optimization model with an objective function for minimizing the quantile loss for the second data set, and determining a weight for each of the quantile regression models, to calculate a power load ensemble forecasting model for predicting the power load in the power system.

6 Claims, 2 Drawing Sheets

METHOD FOR QUANTILE PROBABILISTIC SHORT-TERM POWER LOAD ENSEMBLE FORECASTING, ELECTRONIC DEVICE AND STORAGE MEDIUM

CROSS REFERENCE TO RELATED APPLICATION

This application is a continuation application of International Application No. PCT/CN2018/094551, filed on Jul. 4, 2018, which is based on and claims priority to Chinese Patent Application Serial No. 201810600576.X, filed on Jun. 12, 2018, the entire contents of which are incorporated herein by reference.

TECHNICAL FIELD

The disclosure relates to a field of power system analyzing, and particularly to a method for quantile probabilistic short-term power load ensemble forecasting, electronic device and storage medium.

BACKGROUND

Load forecasting is a basis of power system planning and operation. The load forecasting with high accuracy may facilitate the power systems to make better decisions, reducing the planning and operating costs. Conventional point forecasting could only provide one estimated value for a future load, but is not able to describe the future uncertainty. However, in recent years, with a growth of distributed renewable energy, energy storage and electric vehicles, the power load exhibits greater uncertainty. Accordingly, methods for probabilistic load forecasting has been studied. Probabilistic load forecasting may characterize the uncertainty of the load to be predicted in a form of confidence intervals, probability density or quantile. Compared with the point forecasting, the probabilistic load forecasting may provide more information about the certainty of the future load.

The quantile, as an important type of probabilistic forecasting, has been attracting attention increasingly. Recently, related researches are mainly divided into three types:

1) applying the quantile regression in a load forecasting model directly to obtain a probabilistic forecasting result, wherein the quantile regression model may include any one of a linear quantile regression model, a random forest quantile regression model, a support vector machine quantile regression model, and a neural network quantile regression model.

2) obtaining several results of point forecasting by utilizing multiple set of training data or multiple models first, and then performing quantile regression averaging on those results of point forecasting to obtain a result of quantile forecasting; and 3) obtaining a probabilistic forecasting distribution by means of density estimation, statistical historical error distribution of point forecasting, and then converting the distribution into a quantile result.

Recently, there are many power load forecasting methods. However, with respect to different problems or data sets, there is no guarantee that a certain method may be optimum for all of the data sets. Accordingly, it has been proposed to establish an ensemble forecasting model by integrating various forecasting models to improve generalization performance and forecasting accuracy. Load ensemble forecasting is to determine weights for different forecasting models, and to calculate a weighted average of respective forecasting results according to the determined weights to obtain a final ensemble forecasting result. The methods for generating various forecasting models may applying a specific forecasting model to different training sets, so as to obtain diverse parameters of the models; or for the same set of training data, to train multiple forecasting models such as the linear regression model, the neural network model, or the support vector machine model. Recently, ensemble forecasting has been widely used in the point forecasting of the power load. In the context of increasing load uncertainty due to load diversification, more and more probabilistic power load forecasting models have been proposed. However, in the field of power load forecasting, researches on the quantile probabilistic ensemble forecasting have not been developed.

Existing approaches for probabilistic power load forecasting may include the following.

1. Quantile Regression

Quantile regression mainly derive a regression model for estimating the conditional quantile of the output variables. Compared with the traditional least square regression, the quantile regression may provide more detailed information for the uncertainty of the output variables. The quantile regression may be described as a typical optimization model, as expressed by the following equation:

$$\hat{\beta}(q) = \underset{\beta}{\mathrm{argmin}} \sum_{i=1}^{N} \rho_q(y_i - g(x_i, \beta(q)))$$

In the above equation, i represents an index of a training sample for the model, N represents a total number of the training samples for the model, $x_i$ represents an input of the $i_{th}$ training sample, $y_i$ represents an output of the $i_{th}$ training sample, q represents quantile to be regressed and has a value between 0 and 1, $\beta(q)$ represents a parameter to be estimated for the quantile regression model of the quantile q, and $\rho_q$ represents a loss function for the quantile regression of the quantile q, which may be expressed specifically as follows:

$$\rho_q(y_i - g(x_i, \beta(q))) = \begin{cases} (1-q) \times (g(x_i, \beta(q)) - y_i) & \text{if } y_i \leq g(x_i, \beta(q)) \\ q \times (y_i - g(x_i, \beta(q))) & \text{if } y_i > g(x_i, \beta(q)) \end{cases}$$

Quantile regression models may be solved by optimization algorithms. Particularly, when the quantile regression model $\beta(q)$ is a linear model, the quantile regression may be the traditional linear quantile regression; and when the quantile regression model is one of the neural network regression model, the random forest regression model, the gradient boosting regression tree (GBRT) regression model or the like, the quantile regression may be one of the neural network quantile regression, the random forest quantile regression, the gradient boosting regression tree quantile regression or the like.

2. Pinball Loss Function

The pinball loss function is an indication of the accuracy of the quantile probabilistic load forecasting, which may be calculated specifically as follows:

$$L_i(q) = \begin{cases} (1-q)(\hat{y}_i - y_i) & \text{if } \hat{y}_i \leq y_i \\ q(y_i - \hat{y}_i) & \text{if } \hat{y}_i > y_i \end{cases}$$

In the above expression, $y_i$ represents a true value at the $i_{th}$ load point, $\hat{y}_i$ represents a quantile predicted value of the quantile q at the $i_{th}$ load point. When Q quantiles at N load points need to be predicted in total, an averaged quantile loss may be calculated for measuring the accuracy of the forecasting results comprehensively, as follows:

$$\bar{L} = \sum_{i=1}^{N}\sum_{q=1}^{Q} L_i(q)$$

3. Solution of Linear Planning Optimization

This technology may present an optimal solution of the model by solving a linear planning optimization problem via a computer.

SUMMARY

An object of the present disclosure is to provide a method for quantile probabilistic short-term power load ensemble forecasting, for integrating results of several kinds of existing quantile probabilistic load forecasting.

Another object of the present disclosure is to provide a quantile probabilistic load ensemble forecasting with an objective function for minimizing the pinball loss, to further improve the accuracy of the quantile probabilistic short-term load forecasting.

In one aspect, the present disclosure provides a quantile probabilistic short-term power load ensemble forecasting method, comprising: dividing historical power load data D of a power system with a data length of T into a first data set $D_1$ with a first data length $T_1$ and a second data set $D_2$ with a second data length $T_2$ at a preset ratio; performing bootstrap sampling on the first data set $D_1$, to generate M training data sets, $D_{11}, D_{12}, D_{1m}, \ldots D_{1M}$, m=1, 2, 3, ..., M; training a neural network quantile regression model, a random forest quantile regression model and a gradient boosting regression tree regression model for the M training data sets $D_{11}, D_{12}, D_{1m}, \ldots D_{1M}$ respectively, to obtain K=3M q-quantile forecasting models, wherein q is one of values in a preset set ranging between 0 and 1; establishing an optimization model with an objective function for minimizing the quantile loss for the second data set $D_2$ by using the K=3M q-quantile forecasting models, determining a weight for each quantile regression model, to obtain a load ensemble forecasting model corresponding to the q-quantile; and repeating the step of obtaining quantile forecasting models and the step of calculating a load ensemble forecasting model by traversing the preset set of values of q, to obtain a power load ensemble forecasting model with respect to different quantiles q for predicting the power load in the power system.

In another aspect, the present disclosure provides an electronic device, including: a processor; and a memory for storing instructions executable by the processor, wherein the processor is configured to implement the quantile probabilistic short-term power load ensemble forecasting method as described above and in the following embodiments.

In yet another aspect, the present disclosure provides a non-transitory computer readable storage medium, having a computer program stored thereon, wherein when the computer program is executed by a processor, the processor is configured to perform the quantile probabilistic short-term power load ensemble forecasting method as described above and in the following embodiments.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated.

Figure 1:
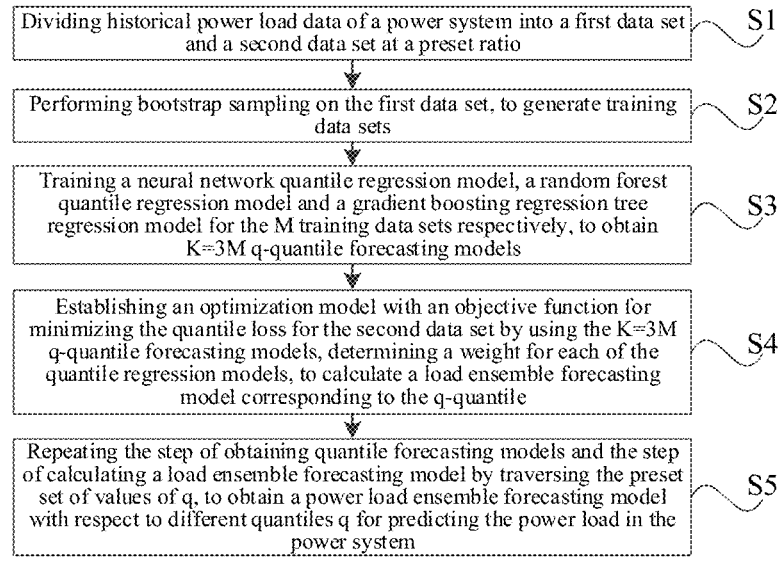
FIG. 1 illustrates a flow chart showing a quantile probabilistic short-term power load ensemble forecasting method according to some embodiments of the present disclosure.

FIG. 1 illustrates a flow chart showing a quantile probabilistic short-term power load ensemble forecasting method according to some embodiments of the present disclosure. As shown in FIG. 1, the method may comprise the following steps.

At step S1, historical power load data D of a power system with a data length of T may be divided into a first data set $D_1$ with a first data length $T_1$ and a second data set $D_2$ with a second data length $T_2$ at a preset ratio.

In some embodiment, the preset ratio may be 4:1. Here, T is a positive integer.

At step S2, bootstrap sampling may be performed on the first data set $D_1$, to generate M training data sets, $D_{11}, D_{12}, D_{1m}, \ldots D_{1M}$, m=1, 2, 3, ..., M. Here, M is a positive integer.

At step S3, a neural network quantile regression model, a random forest quantile regression model and a gradient boosting regression tree regression model for the M training data sets $D_{11}, D_{12}, D_{1m}, \ldots D_{1M}$ may be trained respectively, to obtain K=3M q-quantile forecasting models, wherein q is one of a preset set of values ranging between 0 and 1.

In some embodiments, the preset set of values of q may be {0.01, 0.02, 0.03, . . . 0.98, 0.99}.

The above step S3 for obtaining the quantile forecasting models may further include the following steps S31 to S33.

Figure 2:
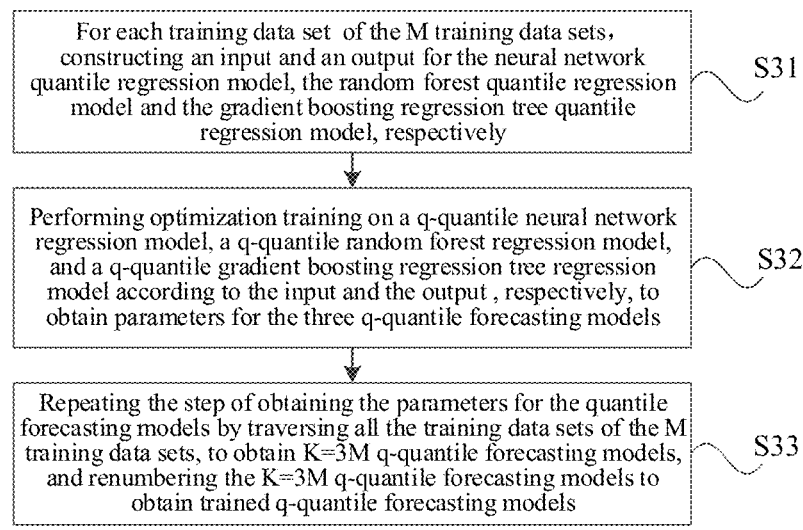
FIG. 2 illustrates a flow chart showing a process for obtaining quantile forecasting models according to some embodiments of the present disclosure.

FIG. 2 illustrates a flow chart showing a process for obtaining the quantile forecasting models according to some embodiments of the present disclosure.

As shown in FIG. 2, at step S31, for each training data set $D_{1m}$ of the M training data sets $D_{11}, D_{12}, D_{1m}, \ldots D_{1M}$, an input $X_{1t}$ and an output $D_{1m}$ may be constructed for the neural network quantile regression model, the random forest quantile regression model and the gradient boosting regression tree quantile regression model, respectively:

$$X_{1t}=[W,h,d_{t-H},d_{t-H-1},d_{t-2H+1},d_{t-2H},d_{t-2H+1},d_{t-3H}],$$

$$y_{1t}=d_t.$$

Here, H represents a number of time periods in one day; h represents the time period in which the power load is to be predicted and h=1, 2, ..., H; W represents a type of the day on which the power load is to be predicted, with W=1 indicating a working day and W=0 indicating a nonworking day; and $d_t$ represents a power load value in the $t_{th}$ time period and t=1, 2, ..., $T_1$. The time period H may be set arbitrarily, such as 1 hour, 15 minutes, etc.

At step S32, optimization training may be performed on a q-quantile neural network regression model $g_{1,m,q}$, a q-quantile random forest regression model $g_{2,m,q}$, and a q-quantile gradient boosting regression tree regression model $g_{3,m,q}$ according to the input $X_{1t}$ and the output $y_{1t}$, respectively, to obtain parameters $\beta_{1,m,q}$, $\beta_{2,m,q}$, and $\beta_{3,m,q}$ for the three q-quantile forecasting models.

The optimization training may be performed according to the following expressions:

$$\min_{\beta_{1,m,q}} \sum_{t=1}^{T_1} \rho_q(y_{1t} - g_{1,m,q}(X_{1t}, \beta_{1,m,q})),$$

$$\min_{\beta_{2,m,q}} \sum_{t=1}^{T_1} \rho_q(y_{1t} - g_{2,m,q}(X_{1t}, \beta_{2,m,q})),$$

$$\min_{\beta_{3,m,q}} \sum_{t=1}^{T_1} \rho_q(y_{1t} - g_{3,m,q}(X_{1t}, \beta_{3,m,q})).$$

Here, $\rho_q$ represents a q-quantile loss function, which may be calculated according to the following expression:

$$\rho_q(y_{1t} - \hat{y}_{tq}) = \begin{cases} (1-q) \times (\hat{y}_{tq} - y_{1t}), & \text{if } y_{1t} \leq \hat{y}_{tq} \\ q \times (y_{1t} - \hat{y}_{tq}), & \text{if } y_{1t} > \hat{y}_{tq} \end{cases}.$$

Here, $\hat{y}_{tq}$ represents a predicted value of the power load that corresponds to the quantile q at time t.

At step S33, the above step S32 may be repeated by traversing all the training data sets of the M training data sets $D_{11}$, $D_{12}$, $D_{1m}$, ..., $D_{1M}$, to obtain K=3M q-quantile forecasting models. The K=3M q-quantile forecasting models may be renumbered to obtain trained q-quantile forecasting models $g_{k,q}$, according to the following equation:

$$g_{k,q} = g_{i,m,q}.$$

Here, k=m+i×M−M, where i is a serial number of the three models trained for each training data set, with i=1, 2, or 3 and m=1, 2, 3, ..., M.

At step S4, an optimization model with an objective function for minimizing the quantile loss may be established for the second data set $D_2$ by using the K=3M q-quantile forecasting models. A weight may be determined for each of the quantile regression models. In this way, a load ensemble forecasting model corresponding to the q-quantile may be calculated.

The above step S4 for calculating the load ensemble forecasting model may further include the following steps S41 to S44.

Figure 3:
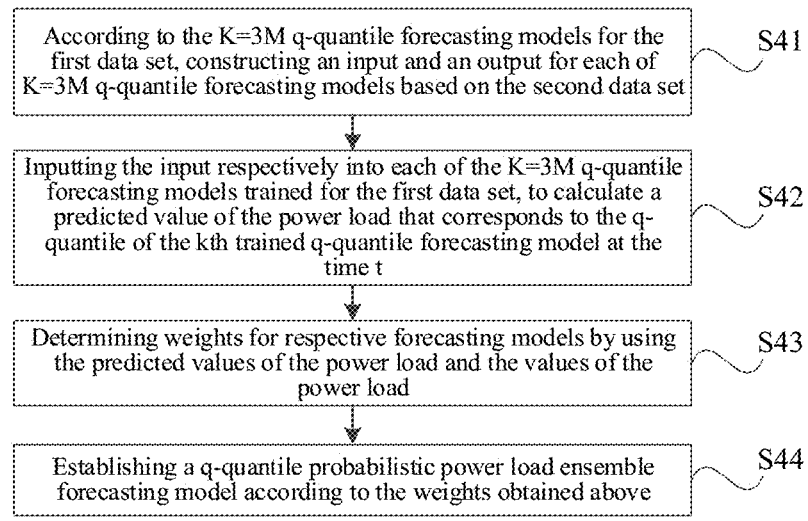
FIG. 3 illustrates a flow chart showing a process for calculating a load ensemble forecasting model according to some embodiments of the present disclosure.

FIG. 3 illustrates a flow chart showing a process for calculating the load ensemble forecasting model according to some embodiments of the present disclosure.

As shown in FIG. 3, at step S41, according to the K=3M q-quantile forecasting models for the first data set $D_1$, an input $T_{2t}$ and an output $y_{2t}$ may be constructed for each of K=3M q-quantile forecasting models based on the second data set $D_2$:

$$X_{2t} = [W, h, d_{t-H}, d_{t-H-1}, d_{t-2H+1}, d_{t-2H}, d_{t-2H+1}, d_{t-3H}],$$

$$y_{2t} = d_t.$$

At step S42, the input $X_{2t}$ may be put respectively into each of the K=3M q-quantile forecasting models trained for the first data set $D_1$, to calculate a predicted value $\hat{y}_{k,g,t}$ of the power load that corresponds to the q-quantile of the $k_{th}$ trained q-quantile forecasting model $g_{k,q}$ at the time t, according to the following equation:

$$\hat{y}_{k,q,t} = g_{k,q}(X_{2t}).$$

At step S43, weights $\omega_q = [\omega_{q1}, \omega_{q2}, \ldots \omega_{qk}, \ldots \omega_{qK}]$ for respective forecasting models may be determined by using the predicted values $\hat{y}_{k,q,t}$ of the power load obtained at the step S42 and the values $y_{2t}$ of the power load obtained at the step S41, according to the following expression:

$$\min_{\omega_q} \sum_{t=1}^{T_2} \rho_q(y_{2t} - \hat{y}_{q,t})$$

$$\text{s.t. } \hat{y}_{q,t} = \sum_{k=1}^{K} \omega_{qk} \hat{y}_{k,q,t}, \sum_{k=1}^{K} \omega_{qk} = 1, \omega_{qk} \geq 0.$$

Here, $\hat{y}_{q,t}$ represents a weighted average value of the K predicted values $\hat{y}_{k,q,t}$ of the power load that correspond to the q-quantile at the time t; $\omega_{qk}$ represents a weight for the $k_{th}$ forecasting model $g_{k,q}$ in the load ensemble forecasting model corresponding to the q-quantile;

$$\sum_{k=1}^{K} \omega_{qk} = 1$$

indicates that a sum of the weights for all the K forecasting models is 1; and $\omega_{qk} \geq 0$ indicates that the weights for all the K forecasting models are nonnegative.

By setting an auxiliary decision variable, the above expression may be rewritten as the following linear optimization model:

$$\min_{\omega_q} \sum_{t=1}^{T_2} v_t$$

$$\text{s.t. } \hat{y}_{q,t} = \sum_{k=1}^{K} \omega_{qk} \hat{y}_{k,q,t}, \sum_{k=1}^{K} \omega_{qk} = 1, \omega_{qk} \geq 0$$

$$v_t \geq q(y_{2t} - \hat{y}_{q,t}), v_t \geq (1-q)(y_{2t} - \hat{y}_{q,t}).$$

The above expression represents a typical linear planning model, which may be solved by using the simplex method. An optimal solution of the model, i.e., an optimal combination of the weights for the K individual forecasting models may be derived.

At step S44, a q-quantile probabilistic power load ensemble forecasting model may be established according to the weights $\omega_q = [\omega_{q1}, \omega_{q2}, \ldots \omega_{qk}, \ldots \omega_{qK}]$ obtained above, according to the following equation:

$$g_q(X_t) = \sum_{k=1}^{K} \omega_{qk} g_{k,q}(X_t).$$

At step S5, steps S3 and S4 may be repeated by traversing the preset set of values of q, to obtain a power load ensemble forecasting model with respect to different quantiles q for predicting the power load in the power system.

The quantile probabilistic short-term power load ensemble forecasting method according to the embodiments of the present disclosure is a quantile load ensemble forecasting method with an objective function for minimizing the quantile loss. With the method, multiple quantile probabilistic forecasting models may be obtained by performing bootstrap sampling on training sets and training different regression models. Then, an optimal quantile ensemble forecasting model may be established based on the trained quantile probabilistic forecasting model, determining the weights for different quantile probabilistic forecasting methods, so as to minimize the pinball loss of the final ensemble forecasting model. The optimization model is converted to a linear planning problem consequently. In this way, global optimal weights may be retrieved quickly, which may further improve the accuracy of the quantile probabilistic short-term load forecasting. Compared with the existing methods, the method according to the present disclosure may present certain weights for various individual forecasting methods quickly, to implement an ensemble of multiple forecasting results. Accordingly, the method according to the present disclosure may be applied to further improve the accuracy of probabilistic load forecasting, and to further reduce the operation cost of the power system. Therefore, it has important practical significance and good application prospects.

Figure 4:
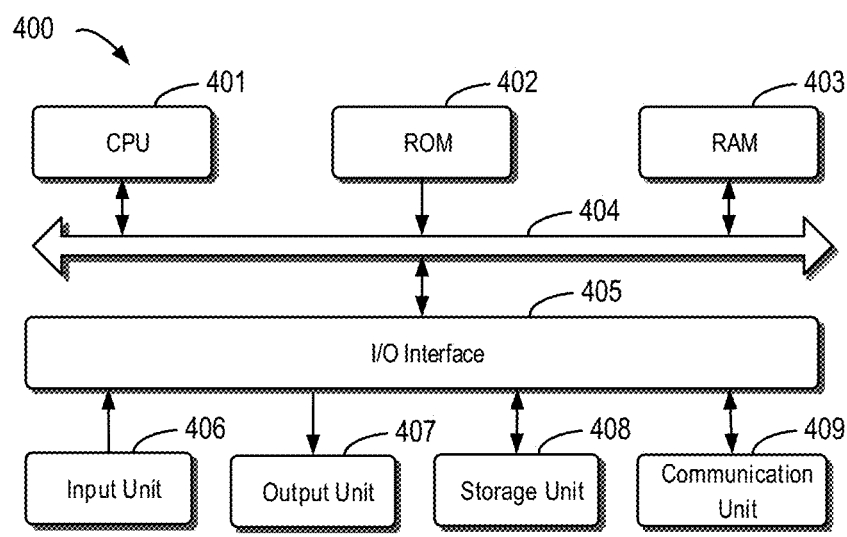
FIG. 4 illustrates a schematic diagram of an exemplary electronic device for implementing some embodiments of the present disclosure.

FIG. 4 illustrates a schematic diagram of an exemplary electronic device 400 for implementing some embodiments of the present disclosure.

As illustrated in FIG. 4, the electronic device 400 includes a center processing unit (CPU) 401, capable of executing various appropriate operations and processes according to computer program instructions stored in a read only memory (ROM) 402 or computer program instructions loaded to a random access memory (RAM) 403 from a storage unit 408. In the RAM 403, various programs and date necessary for the operations of the electronic device 400 may also be stored. The CPU 401, the ROM 402, and the RAM 403 may be connected to each other via a bus 404. An input/output (I/O) interface 405 is also connected to the bus 404.

A plurality of components in the electronic device 400 are connected to the I/O interface 405, including: an input unit 406 such as a keyboard, a mouse; an output unit 407 such as various kinds of displays, speakers; a storage unit 408 such as a magnetic disk, an optical disk; and a communication unit 409, such as a network card, a modem, a wireless communication transceiver. The communication unit 409 allows the electronic device 400 to exchange information/data with other devices over a computer network such as the Internet and/or various telecommunication networks.

The processing unit 401 executes the above-mentioned methods and processes. For example, in some embodiments, the method may be implemented as a computer software program, which may be tangibly contained in a machine readable medium, such as the storage unit 408. In some embodiments, a part or all of the computer programs may be loaded and/or installed on the electronic device 400 through the ROM 402 and/or the communication unit 409. When the computer programs are loaded to the RAM 403 and are executed by the CPU 401, one or more steps in the method described above may be executed. Alternatively, in other embodiments, the CPU 401 may be configured to execute the method in other appropriate manners (such as, by means of firmware).

The functions described above may at least partially be executed by one or more hardware logic components. For example, but not being limitative, exemplary types of hardware logic components that may be used include: a field programmable gate array (FPGA), an application specific integrated circuit (ASIC), an application specific standard product (ASSP), a system on chip (SOC), a complex programmable logic device (CPLD) or the like.

Program codes for implementing the method of the present disclosure may be written in any combination of one or more programming languages. These program codes may be provided to a processor or a controller of a general purpose computer, a special purpose computer or other programmable data processing device, such that the functions/operations specified in the flowcharts and/or the block diagrams are implemented when these program codes are executed by the processor or the controller. These program codes may execute entirely on a machine, partly on a machine, partially on the machine as a stand-alone software package and partially on a remote machine or entirely on a remote machine or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In addition, although the operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific implementation details are included in the above discussion, these should not be construed as limitation of the scope of the present disclosure. Certain features described in the context of separate embodiments may also be implemented in combination in a single implementation. On the contrary, various features described in the context of the single implementation may also be implemented in a plurality of implementations, either individually or in any suitable sub-combination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A quantile probabilistic short-term power load ensemble forecasting method, comprising:
dividing historical power load data D of a power system with a data length of T into a first data set $D_1$ with a first data length $T_1$ and a second data set $D_2$ with a second data length $T_2$ at a preset ratio;

performing bootstrap sampling on the first data set $D_1$, to generate M training data sets, $D_{11}, D_{12}, D_{1m}, \ldots D_{1M}$, m=1, 2, 3, ..., M;

training a neural network quantile regression model, a random forest quantile regression model and a gradient boosting regression tree regression model for the M training data sets $D_{11}, D_{12}, D_{1m}, \ldots D_{1M}$ respectively, to obtain K=3M q-quantile forecasting models, wherein q is one of a preset set of values ranging between 0 and 1;

establishing an optimization model with an objective function for minimizing the quantile loss for the second data set $D_2$ by using the K=3M q-quantile forecasting models, determining a weight for each of the quantile regression models, to calculate a load ensemble forecasting model corresponding to the q-quantile; and repeating the step of obtaining quantile forecasting models and the step of calculating a load ensemble forecasting model by traversing the preset set of values of q, to obtain a power load ensemble forecasting model with respect to different quantiles q for predicting the power load in the power system;

wherein the step of obtaining quantile forecasting models comprises:

for each training data set $D_{1M}$ of the M training data sets $D_{11}, D_{12}, D_{1m}, \ldots D_{1M}$, constructing an input $X_{1t}$ and the output $y_{1t}$ for the neural network quantile regression model, the random forest quantile regression model and the gradient boosting regression tree quantile regression model, respectively:

$$X_{2t}=[W,h,d_{t-H},d_{t-H-1},d_{t-2H+1},d_{t-2H},d_{t-2H+1},d_{t-3H}],$$

$$y_{2t}=d_t,$$

where H represents a number of time periods in one day; h represents the time period in which the power load is to be predicted and h=1, 2, ..., H; W represents a type of the day on which the power load is to be predicted, with W=1 indicating a working day and W=0 indicating a nonworking day; and $d_t$ represents a power load value in the $t_{th}$ time period and t=1, 2, ..., $T_1$, performing optimization training on a q-quantile neural network regression model $g_{1,m,q}$, a q-quantile random forest regression model $g_{2,m,q}$, and a q-quantile gradient boosting regression tree regression model $g_{3,m,q}$ according to the input $X_{1t}$ and the output $y_{1t}$, respectively, to obtain parameters $\beta_{1,m,q}, \beta_{2,m,q}$, and $\beta_{3,m,q}$ for the three q-quantile forecasting models, wherein the optimization training is performed according to the following expressions:

$$\min_{\beta_{1,m,q}} \sum_{t=1}^{T_1} \rho_q(y_{1t} - g_{1,m,q}(X_{1t}, \beta_{1,m,q})),$$

$$\min_{\beta_{2,m,q}} \sum_{t=1}^{T_1} \rho_q(y_{1t} - g_{2,m,q}(X_{1t}, \beta_{2,m,q})),$$

$$\min_{\beta_{3,m,q}} \sum_{t=1}^{T_1} \rho_q(y_{1t} - g_{3,m,q}(X_{1t}, \beta_{3,m,q})),$$

wherein $\rho_q$ represents a q-quantile loss function, which may be calculated according to the following expression:

$$\rho_q(y_{1t} - \hat{y}_{tq}) = \begin{cases} (1-q) \times (\hat{y}_{tq} - y_{1t}), & \text{if } y_{1t} \leq \hat{y}_{tq} \\ q \times (y_{1t} - \hat{y}_{tq}), & \text{if } y_{1t} > \hat{y}_{tq} \end{cases}$$

where $\hat{y}_{tq}$ represents a predicted value of the power load that corresponds to the quantile q at time t; and repeating the step of obtaining the parameters for the quantile forecasting models by traversing all the training data sets of the M training data sets $D_{11}, D_{12}, D_{1m}, \ldots D_{1M}$, to obtain K=3M q-quantile forecasting models, and renumbering the K=3M q-quantile forecasting models to obtain trained q-quantile forecasting models $g_{k,q}$, according to the following equation:

$$g_{k,q}=g_{i,m,q}$$

k=m+i×M−M, where i is a serial number of the three models trained for each training data set, with i=1, 2, or 3 and m=1, 2, 3, ..., M.

2. The method according to claim 1, wherein the step of calculating a load ensemble forecasting model comprises:

according to the K=3M q-quantile forecasting models for the first data set $D_1$, constructing an input $X_{2t}$ and an output $y_{2t}$ for each of K=3M q-quantile forecasting models based on the second data set $D_2$:

$$X_{2t}=[W,h,d_{t-H},d_{t-H-1},d_{t-2H+1},d_{t-2H},d_{t-2H+1},d_{t-3H}],$$

$$y_{2t}=d_t;$$

putting the input $X_{2t}$ respectively into each of the K=3M q-quantile forecasting models trained for the first data set $D_1$, to calculate a predicted value $\hat{y}_{k,q,t}$ of the power load that corresponds to the q-quantile of the $k_{th}$ trained q-quantile forecasting model $g_{k,q}$ at the time t, according to the following equation:

$$\hat{y}_{k,q,t}=g_{k,q}(X_{2t});$$

determining weights $\omega_q=[\omega_{q1}, \omega_{q2}, \ldots \omega_{qk}, \ldots \omega_{qK}]$ for respective forecasting models by using the predicted values $\hat{y}_{k,q,t}$ of the power load and the values $y_{2t}$ of the power load, according to the following expression:

$$\min_{\omega_q} \sum_{t=1}^{T_2} \rho_q(y_{2t} - \hat{y}_{q,t})$$

$$\text{s.t. } \hat{y}_{q,t} = \sum_{k=1}^{K} \omega_{qk} \hat{y}_{k,q,t}, \sum_{k=1}^{K} \omega_{qk} = 1, \omega_{qk} \geq 0,$$

where $\hat{y}_{q,t}$ represents a weighted average value of the K predicted values $\hat{y}_{k,q,t}$ of the power load that correspond to the q-quantile at the time t; $\omega_{qk}$ represents a weight for the $k_{th}$ forecasting model $g_{k,q}$ in the integrated load forecasting model corresponding to $$\sum_{k=1}^{K} \omega_{qk} = 1$$

the q-quantile; indicates that a sum of the weights for all the K forecasting models is 1; and $\omega_{qk} \geq 0$ indicates that the weights for all the K forecasting models are nonnegative;

rewriting the above expression as the following linear optimization model by setting an auxiliary decision variable:

$$\min_{\omega_q} \sum_{t=1}^{T_2} v_t$$

$$\text{s.t. } \hat{y}_{q,t} = \sum_{k=1}^{K} \omega_{qk} \hat{y}_{k,q,t}, \sum_{k=1}^{K} \omega_{qk} = 1, \omega_{qk} \geq 0$$

$$v_t \geq q(y_{2t} - \hat{y}_{q,t}), v_t \geq (1-q)(y_{2t} - \hat{y}_{q,t});$$

establishing a q-quantile probabilistic power load ensemble forecasting model according to the weights $\omega_q = [\omega_{q1}, \omega_{q2}, \ldots \omega_{qk}, \ldots \omega_{qK}]$ obtained above, according to the following equation:

$$g_q(X_t) = \sum_{k=1}^{K} \omega_{qk} g_{k,q}(X_t).$$

3. The method according to claim 1, wherein the preset ratio is 4:1.

4. The method according to claim 1, wherein the preset set of values of q is {0.01, 0.02, 0.03, . . . 0.98, 0.99}.

5. An electronic device, comprising:
a processor; and
a memory for storing instructions executable by the processor, wherein the processor is configured to:
divide historical power load data D of a power system with a data length of T into a first data set $D_1$ with a first data length $T_1$ and a second data set $D_2$ with a second data length $T_2$ at a preset ratio;
perform bootstrap sampling on the first data set $D_1$, to generate M training data sets $D_{11}, D_{12}, D_{1m}, \ldots D_{1M}$, m=1, 2, 3, . . . , M;
train a neural network quantile regression model, a random forest quantile regression model and a gradient boosting regression tree regression model for the M training data sets $D_{11}, D_{12}, D_{1m}, \ldots D_{1M}$ respectively, to obtain K=3M q-quantile forecasting models, wherein q is one of a preset set of values ranging between 0 and 1;
establish an optimization model with an objective function for minimizing the quantile loss for the second data set $D_2$ by using the K=3M q-quantile forecasting models, determine a weight for each of the quantile regression models, to calculate a load ensemble forecasting model corresponding to the q-quantile; and
repeat the step of obtaining quantile forecasting models and the step of calculating a load ensemble forecasting model by traversing the preset set of values of q, to obtain a power load ensemble forecasting model with respect to different quantiles q for predicting the power load in the power system;
wherein the step of obtaining quantile forecasting models comprises:
for each training data set $D_{1m}$ of the M training data sets $D_{11}, D_{12}, D_{1m}, \ldots D_{1M}$, constructing an input $X_{1t}$ and an output $y_{1t}$ for the neural network quantile regression model, the random forest quantile regression model and the gradient boosting regression tree quantile regression model, respectively:

$$X_{2t} = [W, h, d_{t-H}, d_{t-H-1}, d_{t-2H+1}, d_{t-2H}, d_{t-2H+1}, d_{t-3H}],$$

$$y_{2t} = d_t,$$

where H represents a number of time periods in one day; h represents the time period in which the power load is to be predicted and h=1, 2, . . . , H; W represents a type of the day on which the power load is to be predicted, with W=1 indicating a working day and W=0 indicating a nonworking day; and $d_t$ represents a power load value in the $t_{th}$ time period and t=1, 2, . . . , $T_1$, performing optimization training on a q-quantile neural network regression model $g_{1,m,q}$, a q-quantile random forest regression model $g_{2,m,q}$, and a q-quantile gradient boosting regression tree regression model $g_{3,m,q}$ according to the input $X_{1t}$ and the output $y_{1t}$, respectively, to obtain parameters $\beta_{1,m,q}$, $\beta_{2,m,q}$, and $\beta_{3,m,q}$ for the three q-quantile forecasting models, wherein the optimization training is performed according to the following expressions:

$$\min_{\beta_{1,m,q}} \sum_{t=1}^{T_1} \rho_q(y_{1t} - g_{1,m,q}(X_{1t}, \beta_{1,m,q})),$$

$$\min_{\beta_{2,m,q}} \sum_{t=1}^{T_1} \rho_q(y_{1t} - g_{2,m,q}(X_{1t}, \beta_{2,m,q})),$$

$$\min_{\beta_{3,m,q}} \sum_{t=1}^{T_1} \rho_q(y_{1t} - g_{3,m,q}(X_{1t}, \beta_{3,m,q})),$$

wherein $\rho_q$ represents a q-quantile loss function, which may be calculated according to the following expression:

$$\rho_q(y_{1t} - \hat{y}_{tq}) = \begin{cases} (1-q) \times (\hat{y}_{tq} - y_{1t}), & \text{if } y_{1t} \leq \hat{y}_{tq} \\ q \times (y_{1t} - \hat{y}_{tq}), & \text{if } y_{1t} > \hat{y}_{tq} \end{cases}$$

where $\hat{y}_{tq}$ represents a predicted value of the power load that corresponds to the quantile q at time t; and
repeating the step of obtaining the parameters for the quantile forecasting models by traversing all the training data sets of the M training data sets $D_{11}, D_{12}, D_{1m}, \ldots D_{1M}$, to obtain K=3M q-quantile forecasting models, and renumbering the K=3M q-quantile forecasting models to obtain trained q-quantile forecasting models $g_{k,q}$, according to the following equation:

$$g_{k,q} = g_{i,m,q}$$

k=m+i×M−M, where i is a serial number of the three models trained for each training data set, with i=1, 2, or 3 and m=1, 2, 3, . . . , M.

6. A non-transitory computer readable storage medium, having a computer program stored thereon, wherein when the computer program is executed by a processor, the processor is configured to perform a quantile probabilistic short-term power load ensemble forecasting method, wherein the method comprises:
dividing historical power load data D of a power system with a data length of T into a first data set $D_1$ with a first data length $T_1$ and a second data set $D_2$ with a second data length $T_2$ at a preset ratio;

performing bootstrap sampling on the first data set $D_1$, to generate M training data sets, $D_{11}, D_{12}, D_{1m}, \ldots D_{1M}$, m=1, 2, 3, . . . , M;

training a neural network quantile regression model, a random forest quantile regression model and a gradient boosting regression tree regression model for the M training data sets $D_{11}, D_{12}, D_{1m}, \ldots D_{1M}$ respectively, to obtain K=3M q-quantile forecasting models, wherein q is one of a preset set of values ranging between 0 and 1;

establishing an optimization model with an objective function for minimizing the quantile loss for the second data set $D_2$ by using the K=3M q-quantile forecasting models, determining a weight for each of the quantile regression models, to calculate a load ensemble forecasting model corresponding to the q-quantile; and repeating the step of obtaining quantile forecasting models and the step of calculating an load ensemble forecasting model by traversing the preset set of values of q, to obtain a power load ensemble forecasting model with respect to different quantiles q for predicting the power load in the power system;

wherein the step of obtaining quantile forecasting models comprises:

for each training data set $D_{1m}$ of the M training data sets $D_{11}, D_{12}, D_{1m}, \ldots D_{1M}$, constructing an input $X_{1t}$ and an output $y_{1t}$ for the neural network quantile regression model, the random forest quantile regression model and the gradient boosting regression tree quantile regression model, respectively:

$X_{1t}=[W,h,d_{t-H},d_{t-H-1},d_{t-2H+1},d_{t-2H},d_{t-2H+1},d_{t-3H}]$, $y_{1t}=d_t$, where H represents a number of time periods in one day; h represents the time period in which the power load is to be predicted and h=1, 2, . . . , H; W represents a type of the day on which the power load is to be predicted, with W=1 indicating a working day and W=0 indicating a nonworking day; and $d_t$ represents a power load value in the $t_{th}$ time period and t=1, 2, . . . , $T_1$, performing optimization training on a q-quantile neural network regression model $g_{1,m,q}$, a q-quantile random forest regression model $g_{2,m,q}$, and a q-quantile gradient boosting regression tree regression model $g_{3,m,q}$ according to the input $X_{1t}$ and the output $y_{1t}$, respectively, to obtain parameters $\beta_{1,m,q}$, $\beta_{2,m,q}$, and $\beta_{3,m,q}$ for the three q-quantile forecasting models, wherein the optimization training is performed according to the following expressions:

$$\min_{\beta_{1,m,q}} \sum_{t=1}^{T_1} \rho_q(y_{1t} - g_{1,m,q}(X_{1t}, \beta_{1,m,q})),$$

$$\min_{\beta_{2,m,q}} \sum_{t=1}^{T_1} \rho_q(y_{1t} - g_{2,m,q}(X_{1t}, \beta_{2,m,q})),$$

$$\min_{\beta_{3,m,q}} \sum_{t=1}^{T_1} \rho_q(y_{1t} - g_{3,m,q}(X_{1t}, \beta_{3,m,q})),$$

wherein $\rho q$ represents a q-quantile loss function, which may be calculated according to the following expression:

$$\rho_q(y_{1t} - \hat{y}_{tq}) = \begin{cases} (1-q) \times (\hat{y}_{tq} - y_{1t}), & \text{if } y_{1t} \leq \hat{y}_{tq} \\ q \times (y_{1t} - \hat{y}_{tq}), & \text{if } y_{1t} > \hat{y}_{tq} \end{cases}$$

where $\hat{y}_{tq}$ represents a predicted value of the power load that corresponds to the quantile q at time t; and repeating the step of obtaining the parameters for the quantile forecasting models by traversing all the training data sets of the M training data sets $D_{11}, D_{12}, D_{1m}, \ldots D_{1M}$, to obtain K=3M q-quantile forecasting models, and renumbering the K=3M q-quantile forecasting models to obtain trained q-quantile forecasting models $g_{k,q}$, according to the following equation:

$g_{k,q}=g_{i,m,q}$ k=m+i×M−M, where i is a serial number of the three models trained for each training data set, with i=1, 2, or 3 and m=1, 2, 3, . . . , M.

* * * * *